Jan. 3, 1950     W. RAMBERG     2,493,029
ELECTRIC DYNAMOMETER
Filed Sept. 25, 1945
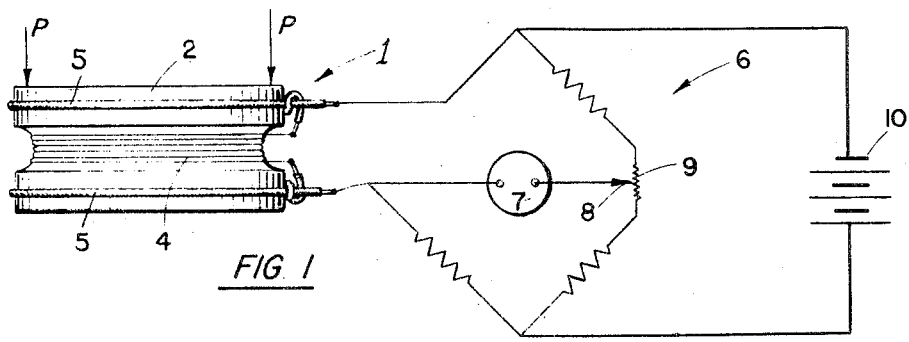
FIG. 1
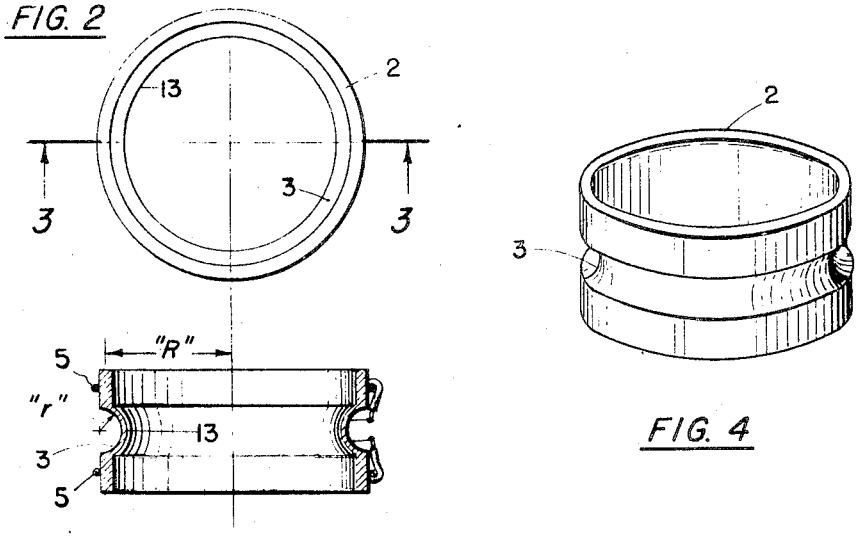
FIG. 2
FIG. 3
FIG. 4
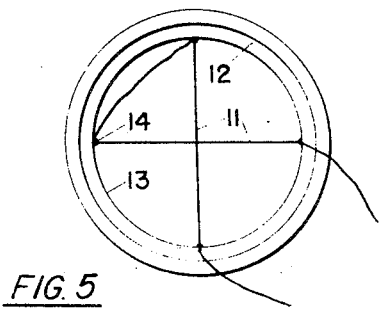
FIG. 5
INVENTOR
WALTER RAMBERG
BY Ralph L. Chappell
ATTORNEY Patented Jan. 3, 1950

2,493,029

UNITED STATES PATENT OFFICE 2,493,029

ELECTRIC DYNAMOMETER

Walter Ramberg, Chevy Chase, Md.

Application September 25, 1945, Serial No. 618,596

7 Claims. (Cl. 201—63)

(Granted under the act of March 3, 1883, as amended April 30, 1928; 370 O. G. 757)

This invention relates to dynamometers, and more particularly to the electrical resistance wire type.

My invention has an advantage over the usual dynamometers in that it provides an unusual combination of light weight, rigidity, high sensitivity, and high natural frequency. It is, therefore, suited for measuring very rapidly changing small forces and for measuring tensile and compressive forces applied by machines with very limited travel, such as hardness testing machines. A model built consisted of an aluminum alloy cylinder approximately one inch in diameter, one-half inch high, weighing one-hundredth of a pound. It indicated compressive loads up to eighty pounds with an error not exceeding two-tenths of a pound.

The principal object of my invention is to provide a light-weight pick-up for measuring axial forces.

Another object of my invention is to provide a novel tubular dynamometer means wherein an unusually large circumferential strain is produced in a local region of the dynamometer under a tensile or compressive axial force.

For a more complete understanding of the invention and for other objects and advantages thereof, reference should now be had to the following descriptions in connection with the accompanying drawings, in which Fig. 1 is an elevational view of my pick-up device connected to a Wheatstone bridge circuit, the strain sensitive wires being cemented into position with any initial strain;

Fig. 2 is a plan view of the pick-up;

Fig. 3 is a half-sectional view of the pick-up taken along line 3—3 of Fig. 2;

Fig. 4 is an isometric view of the pick-up;

Fig. 5 is a plan view of the pick-up device provided with initially strained strain-sensitive wires connecting diametrically opposite points on the vertex of the corrugation.

Turning now to Fig. 1, numeral 1 indicates generally the pick-up unit consisting of a thick-walled tubular element 2 having a membranaceous center portion formed into an inwardly projecting annular corrugation 3 of radius $r$. The average radius of the tubular element 2 is $R$. Heavy insulated wires 5 are tightly wound around the upper and lower ends of said tubular element 2 and secured thereto as by twisting the free ends of said heavy wires. An insulated fine strain-sensitive wire 4 is wound in corrugation 3 and secured in place by cementing and connection to a rigid free end of said upper and lower heavy wires 5. The cementing of strain-sensitive wire in position with insulating cement is an effective and well known means for transferring the strain from the corrugation to the strain-sensitive wire.

However, other methods of securement would serve my purpose, such as winding the strain-sensitive wire under initial tension in the corrugation and locking this tension by any conventional anchorage of the strain-sensitive wire to the tubular element 2, such as by spot welding, brazing, or by securement to an eye bolt screwed into element 2. In a preferred embodiment of this modification, the initial tension can be locked in by connection to the free ends of heavy wire 5 which is sufficiently rigid to resist a reasonable tension pull.

It is understood that the strain-sensitive wire 4 in either case (tensioned or untensioned) can be wound and secured to the inside periphery as well as to the outside periphery of said corrugation 3.

A further modification of my invention, as shown by Fig. 5, discloses strain-sensitive wires 11 under initial strain, strung and secured to diametrically opposite points on the vertex 13 of the corrugation 12. The securement to the vertex is by means of brazing 14, but can be accomplished by any conventional means that would not effect the circumferential strain.

The electric circuits employed take the form of a Wheatstone bridge indicated generally by numeral 6, in which the strain-sensitive wires 4 form one arm thereof, the electrical connection therebetween being made through leads 5. Any potential responsive indicating device 7, such as a galvanometer or oscilloscope, is connected across diagonally opposite corners of said bridge. Said indicating device is associated with a sliding contact 8 and a small zero-setting resistance 9 for balancing said bridge 6. Battery 10 is connected across the bridge in the usual manner to energize the same. Any departure from a predetermined and initial reading or reference point of the indicating device 7 serves to detect a strain in wires 4, the magnitude of which is easily ascertainable by suitable calibration of said indicating device 7 or by measuring the change in resistance which is required to restore balance.

Operation

The use of fine strain-sensitive wires to measure force is not novel, and the manner of application is fairly obvious, as is hereinafter described. The wire is attached to an elastic member which is then strained an amount that is proportional to the force to be measured. The straining of the wire produces a proportional change in resistance which can be measured with an electrical circuit and indicator.

In operation, when an axial load P is applied to the pick-up, a circumferential strain is developed in the annular corrugation 3 portion. This circumferential strain is transferred to the juxta-positioned strain-sensitive cemented wire 4 whose change in resistance will be proportional to the axial load P on the pick-up. Hence, under load P, the circumference of the corrugation 3 is decreased, the cemented wire 4 is strained in compression decreasing its resistance an amount proportional to P. The double curvature at the foot of the corrugation makes possible the creation of a relatively large circumferential strain under a moderate axial load P acting on the end of the pick-up. Analysis of the thin-walled center portion 3 as an elastic membrane of double curvature shows that the circumferential strain can be made considerably larger than the axial strain by increasing the ratio of radii $R/r$.

Having had the bridge originally balanced, the change in resistance caused by change of strain in wires 4 can be measured either on indicating means 7 by its departure from its balanced reference position or by rebalancing the bridge 6 by measurable changes in resistance in one of its arms.

It is understood that this device functions equally well if the force P be a tensile force instead of a compressive force as above described.

Other means than a winding of strain-sensitive wire could have been utilized to respond to the relatively large circumferential strains at the bottom of the corrugation which is the basic novelty of my invention. Such other means of detection could be optical means detecting diameter changes of the corrugation when the tubular element is subjected to axial loads.

A modification of Fig. 1. whereby the strain-sensitive wire is held initially tensioned and not cemented in the corrugation, operates to relieve or increase said initial tension when the tubular element is subjected to a compressive or tensile force, respectively. This variation in strain changes the resistance of said strain-sensitive wire which is detected by the indicating means as described above.

The modification as disclosed by Fig. 5 likewise operates to relieve or increase the initial tension of the diametrically disposed strain-sensitive wires, and is detected by the indicating means as described above.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

The invention described herein may be manufactured and used by or for the Government of the United States of America for governmental purposes without the payment of any royalties thereon or therefor.

What is claimed is:

1. In a dynamometer, a force responsive means comprising: a tubular member having a membranaceous annular corrugation normally having a semicircular section and adapted to obtain a relatively large circumferential strain at the bottom thereof proportional to said force when said tubular member is subjected to an axial force.

2. In a dynamometer, a force responsive means comprising: a tubular member having a membranaceous annular corrugation adapted to obtain a relatively large circumferential strain when said tubular member is subjected to an axial force; and a wire strain gauge associated with said corrugation for detecting the circumferential strain thereof.

3. In a dynamometer a force responsive pick-up, comprising: a tubular member having a membranaceous annular corrugation adapted to obtain a relatively large circumferential strain when said tubular member is subjected to an axial force; and strain-sensitive wire wound and bonded on said corrugation surface.

4. In a dynamometer a force responsive pick-up, comprising: a tubular member having a membranaceous annular corrugation adapted to obtain a relatively large circumferential strain when said tubular member is subjected to an axial force; and prestrained strain-sensitive wire wound on said corrugation surface and having its ends anchored on said tubular member.

5. In a dynamometer a force responsive pick-up, comprising: a tubular member having a membranaceous annular corrugation adapted to obtain a relatively large circumferential strain when said tubular member is subjected to an axial force; and an initially tensioned strain-sensitive wire wound on said corrugation surface.

6. In a dynamometer a force responsive pick-up, comprising: a tubular member having a membranaceous annular corrugation adapted to obtain a relatively large circumferential strain when said tubular member is subjected to an axial force; and an initially tensioned strain-sensitive wire connecting a plurality of points substantially on the vertex of said corrugation.

7. In a dynamometer a force responsive pick-up, comprising: a tubular member having a membranaceous annular corrugation adapted to obtain a relatively large circumferential strain when said tubular member is subjected to an axial force; and an initially tensioned strain-sensitive wire connecting diametrically opposite points on the vertex of the corrugation.

WALTER RAMBERG.

REFERENCES CITED

The following references are of record in the file of this patent:

UNITED STATES PATENTS

| Number | Name | Date |
|---|---|---|
| 1,680,485 | Swan | Aug. 14, 1928 |
| 1,925,949 | Case | Sept. 5, 1933 |
| 2,050,106 | Lorig et al. | Aug. 4, 1936 |
| 2,322,319 | Ruge | June 22, 1943 |
| 2,327,935 | Simmons | Aug. 24, 1943 |